US010399840B2

(12) United States Patent
Balstad et al.

(10) Patent No.: US 10,399,840 B2
(45) Date of Patent: Sep. 3, 2019

(54) BEVERAGE DISPENSING VALVE SYSTEM

(71) Applicant: PepsiCo, Inc., Purchase, NY (US)

(72) Inventors: Robert W. Balstad, New Milford, CT (US); Terry Tae-Il Chung, New Fairfield, CT (US); Hari Koripoti, Telangana (IN); Mohan Rao P, Telangana (IN)

(73) Assignee: PepsiCo, Inc., Purchase, NY (US)

( * ) Notice: Subject to any disclaimer, the term of this patent is extended or adjusted under 35 U.S.C. 154(b) by 83 days.

(21) Appl. No.: 15/133,074

(22) Filed: Apr. 19, 2016

(65) Prior Publication Data

US 2017/0297887 A1    Oct. 19, 2017

(51) Int. Cl.
| | |
|---|---|
| *B67D 1/00* | (2006.01) |
| *B67D 1/08* | (2006.01) |
| *B67D 1/12* | (2006.01) |
| *F16K 27/00* | (2006.01) |
| *F16K 31/06* | (2006.01) |
| *F16K 31/12* | (2006.01) |
| *F16K 31/04* | (2006.01) |

(52) U.S. Cl.
CPC ......... *B67D 1/0085* (2013.01); *B67D 1/0022* (2013.01); *B67D 1/0036* (2013.01); *B67D 1/0888* (2013.01); *B67D 1/1277* (2013.01); *F16K 27/003* (2013.01); *F16K 31/04* (2013.01); *F16K 31/06* (2013.01); *F16K 31/12* (2013.01); *B67D 2210/00089* (2013.01); *B67D 2210/00091* (2013.01)

(58) Field of Classification Search
CPC .............................. F16K 31/06; B67D 1/0085

USPC ........................................................ 222/144
See application file for complete search history.

(56) References Cited

U.S. PATENT DOCUMENTS

| | | | | |
|---|---|---|---|---|
| 3,034,685 | A * | 5/1962 | Breitenstein | B67D 3/0003 222/129.1 |
| 3,727,844 | A | 4/1973 | Beneic | |
| 5,738,247 | A * | 4/1998 | Kuan | B01F 13/1055 222/144 |
| 5,762,098 | A * | 6/1998 | Manzone | B01F 13/1058 137/312 |
| 7,501,283 | B2 * | 3/2009 | Hersch | B01L 3/0265 222/144 |
| 7,673,775 | B2 * | 3/2010 | Penciu | B01F 13/1058 222/144 |
| 2003/0141379 | A1 | 7/2003 | Kuykendal et al. | |
| 2005/0087545 | A1 * | 4/2005 | Petrus Engels | B01F 13/1058 222/1 |
| 2005/0115989 | A1 | 6/2005 | Ludovissie et al. | |
| 2014/0188271 | A1 | 7/2014 | Hernandez et al. | |
| 2015/0060482 | A1 * | 3/2015 | Murray | A47J 31/404 222/1 |

(Continued)

OTHER PUBLICATIONS

International Search Report and Written Opinion of the International Searching Authority, issued in PCT/US2017/028132, dated Jul. 3, 2017, 14 pages.

*Primary Examiner* — J C Jacyna
(74) *Attorney, Agent, or Firm* — Sterne, Kessler, Goldstein & Fox P.L.L.C.

(57) ABSTRACT

A post-mix beverage dispenser utilizing a beverage dispensing valve including a movable valve activation device is provided. The beverage dispensing valve can move the valve activation device to a predetermined activation position to dispense a fluid in response to a control signal.

16 Claims, 14 Drawing Sheets

(56) References Cited

U.S. PATENT DOCUMENTS

2016/0159632 A1* 6/2016 Wheatley ............ G06F 19/3475
222/1

* cited by examiner

BEVERAGE DISPENSING VALVE SYSTEM

BACKGROUND

Field

Embodiments of the present invention relate to post-mix dispensers to dispense a custom beverage from beverage liquid concentrates including flavor concentrates.

Background

Post-mix dispensers typically permit a beverage to be created on-demand from a mixture of ingredients. An advantage of dispensing beverage in this form is that the concentrate containers and water supply typically occupy significantly less space than is otherwise required to store the same volume of beverage in individual containers. Moreover, this dispensing equipment eliminates increased waste formed by the empty individual containers as well as additional transport costs. These and other technological advances have allowed food and beverage vendors to offer more diverse choices to consumers through post-mix dispensing systems.

Traditional post-mix beverage dispensing systems utilize a one-to-one relationship of actuation valve to fluid source. This one-to-one relationship results in higher cost for fluid management, electronic controls, and an increased space requirement on beverage dispensing equipment.

BRIEF SUMMARY OF THE INVENTION

One aspect of the invention permits post-mix beverage dispensing with a beverage dispensing valve system including a movable valve activation device. The valve activation device can be indexed to dispense diluent, brand concentrate, or flavor concentrate from one of a plurality of flow regulators. Software can direct the position of the valve activation device by moving the valve activation device to the appropriate position to activate a flow valve related to the selected diluent, brand concentrate, or flavor concentrate based on a user input. In a further aspect, multiple beverage dispensing valve systems can be utilized, for example, a first beverage dispensing valve system for a diluent group, a second beverage dispensing valve system for a brand concentrate group, and a third beverage dispensing valve system for a flavor concentrate group.

In one aspect of the invention, the post-mix beverage dispensing system can include a beverage dispensing valve system including a first flow regulator having a first flow path and a first core positioned to open and close the first flow path, a second flow regulator having a second flow path and a second core to open and close the second flow path, and a movable valve activation device. The valve activation device can be movable to a first position adjacent the first core to cause the first core to open the first flow path or a second position adjacent the second core to cause the second core to open the second flow path.

In a further aspect of the invention, a method of indexing a movable valve activation device can include providing a beverage dispensing valve including a first flow regulator at a first position, a second flow regulator at a second position, and a motor to move the valve activation device to the first position or the second position. The method can include moving the valve activation device to the first position and generating first electronic position data representative of the first position. The method can also include moving the valve activation device to the second position and generating second electronic position data representative of the second position. The method can also include storing the first electronic position data and the second electronic position data in a memory of a beverage dispensing system that includes a user interface. The method can also include electronically linking the first electronic position data to a first user selection on the user interface and electronically linking the second electronic position data to a second user selection on the user interface.

In another aspect of the invention, a method of dispensing a beverage from a post-mix beverage dispensing system can include providing a post-mix beverage dispensing system including an electronic control system, an electronic user interface, and a valve system having a movable valve activation device. The method can include transmitting a first electronic signal to the control system based on a first user selection on the electronic user interface, moving the movable valve activation device based on the first electronic signal to a position adjacent a flow regulator, transmitting a second electronic signal to the control system based on a second user selection on the user interface, and initiating the movable valve activation device based on the second electronic signal to open a flow path in the flow regulator to dispense a fluid.

Further features and advantages of embodiments of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to a person skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 5:
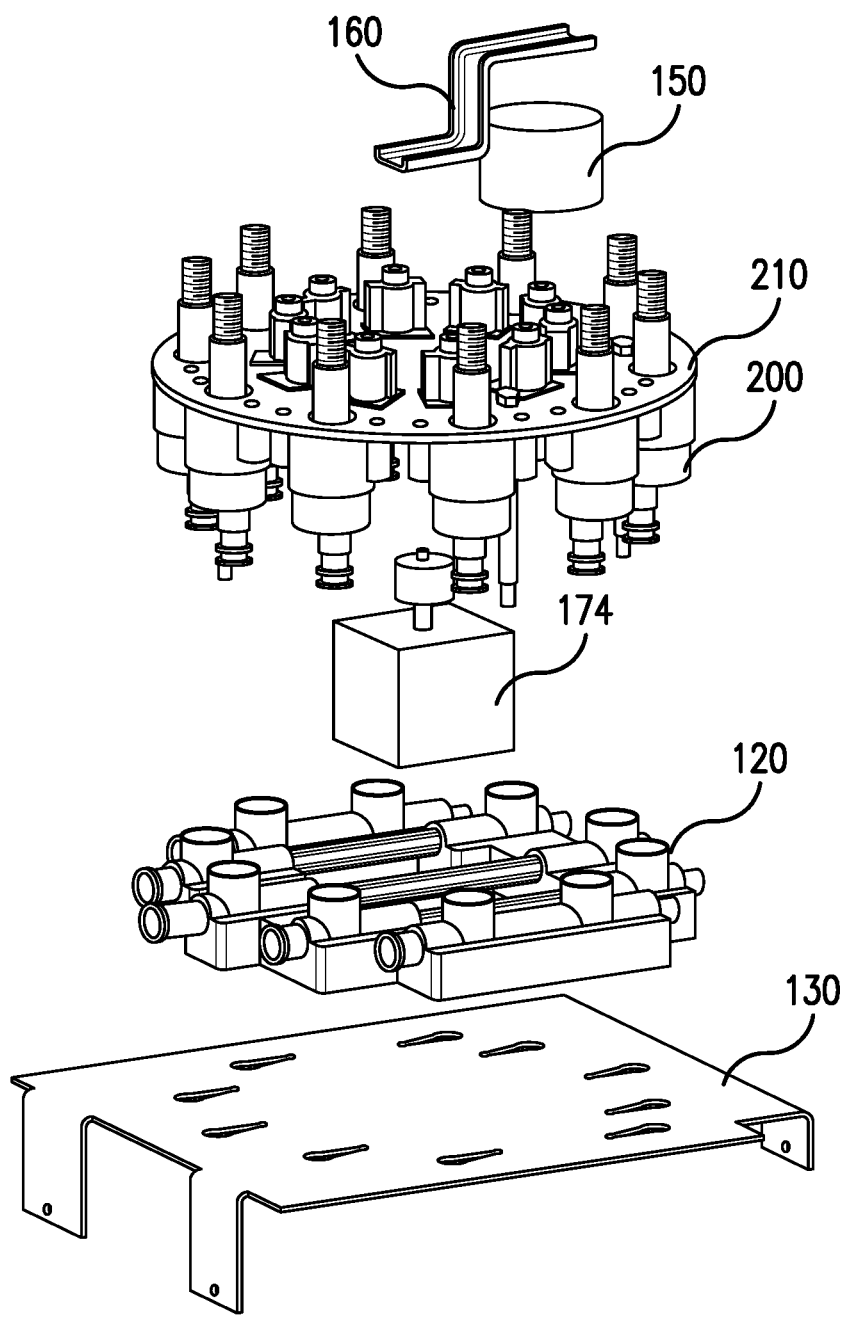

FIG. 5. is an assembly view of a beverage dispensing valve system according to various aspects of the invention.

Figure 6:
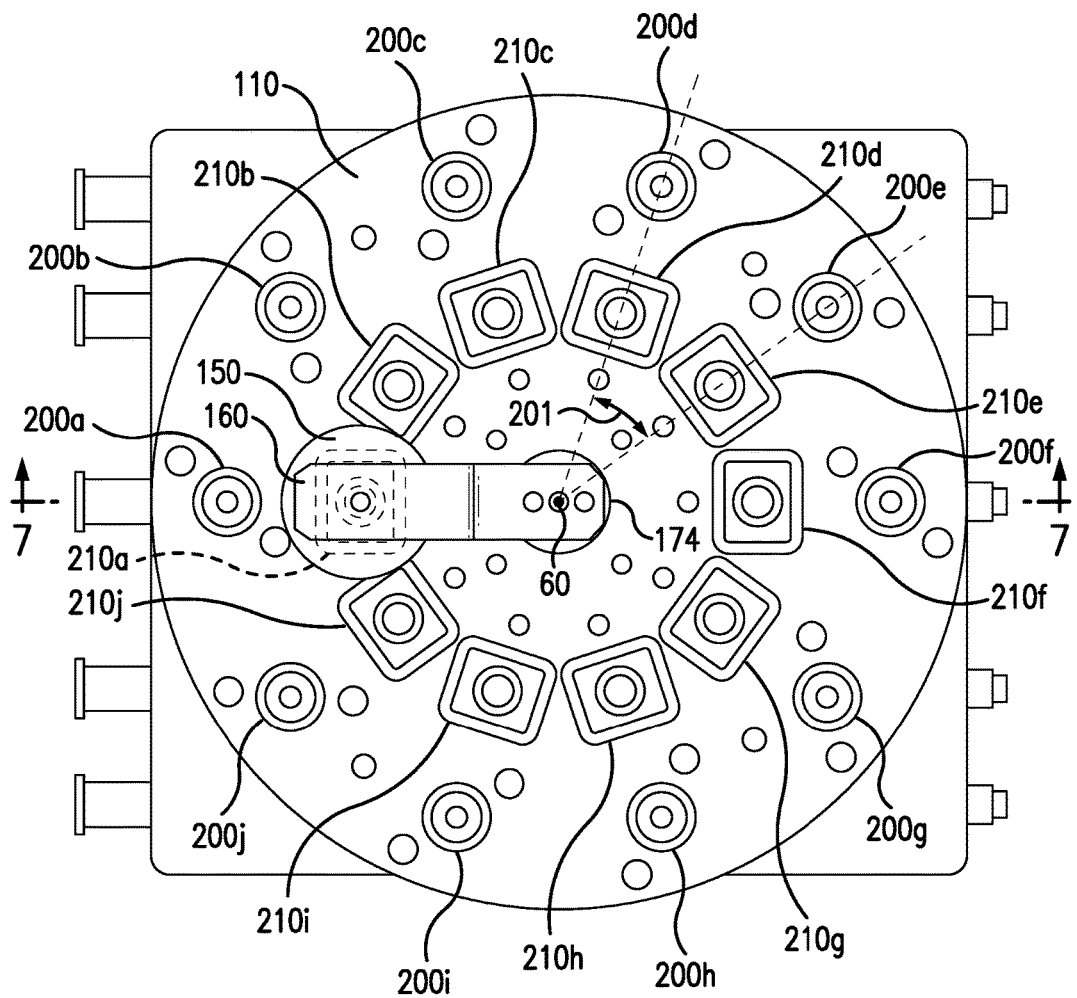

FIG. 6. is a top view of a beverage dispensing valve system according to various aspects of the invention.

Figure 7:
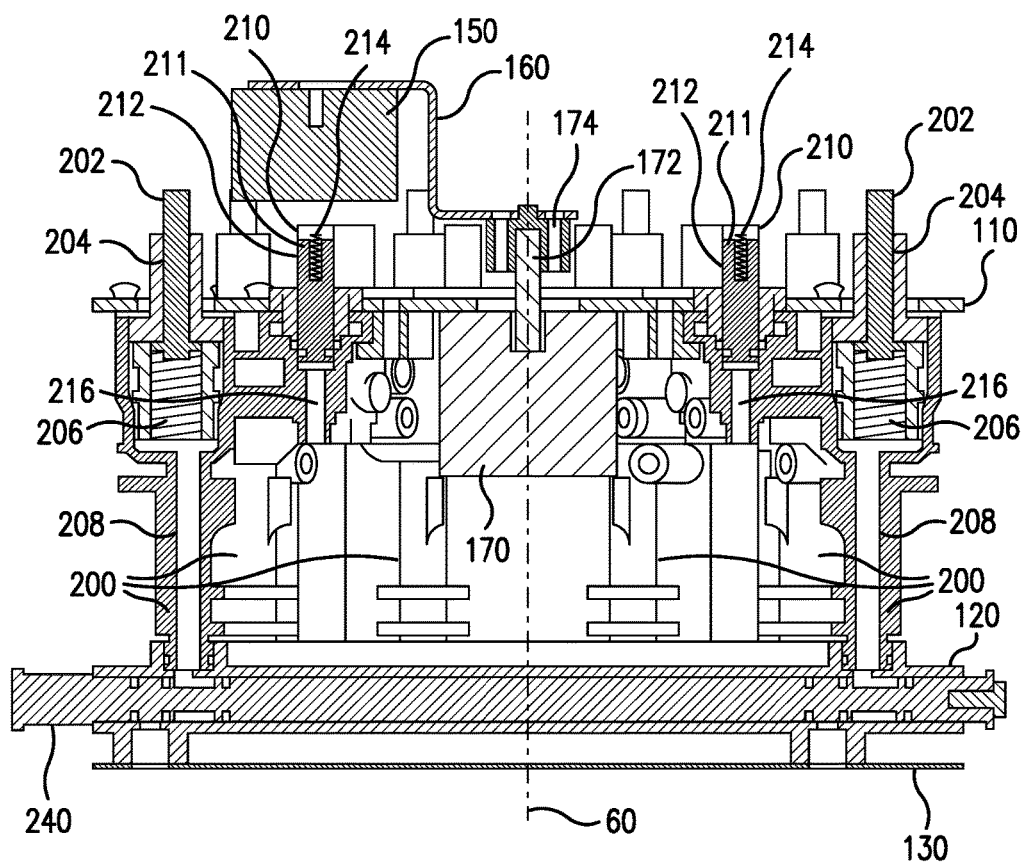

FIG. 7. is a sectional view of a beverage dispensing valve system according to various aspects of the invention taken along line 7-7 of FIG. 6.

Figure 8:
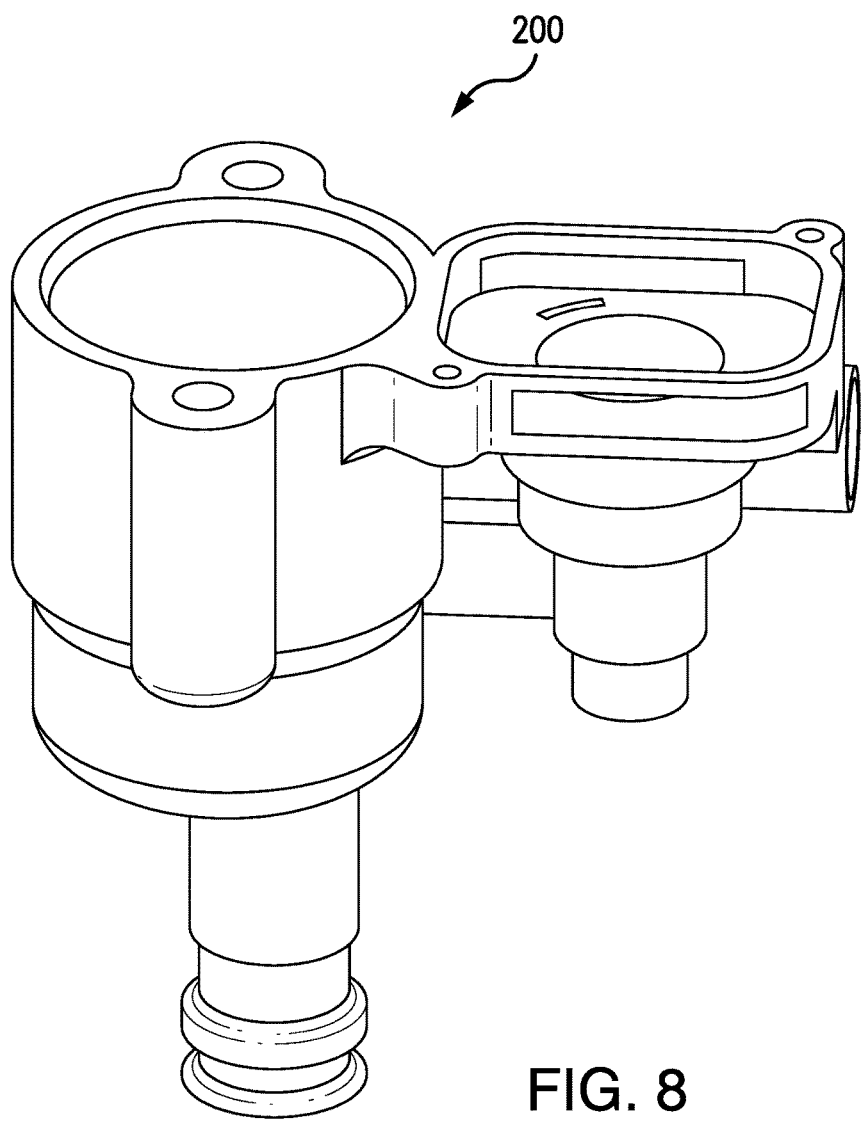

FIG. 8 is a perspective view of a flow regulator according to various aspects of the invention.

Figure 9:
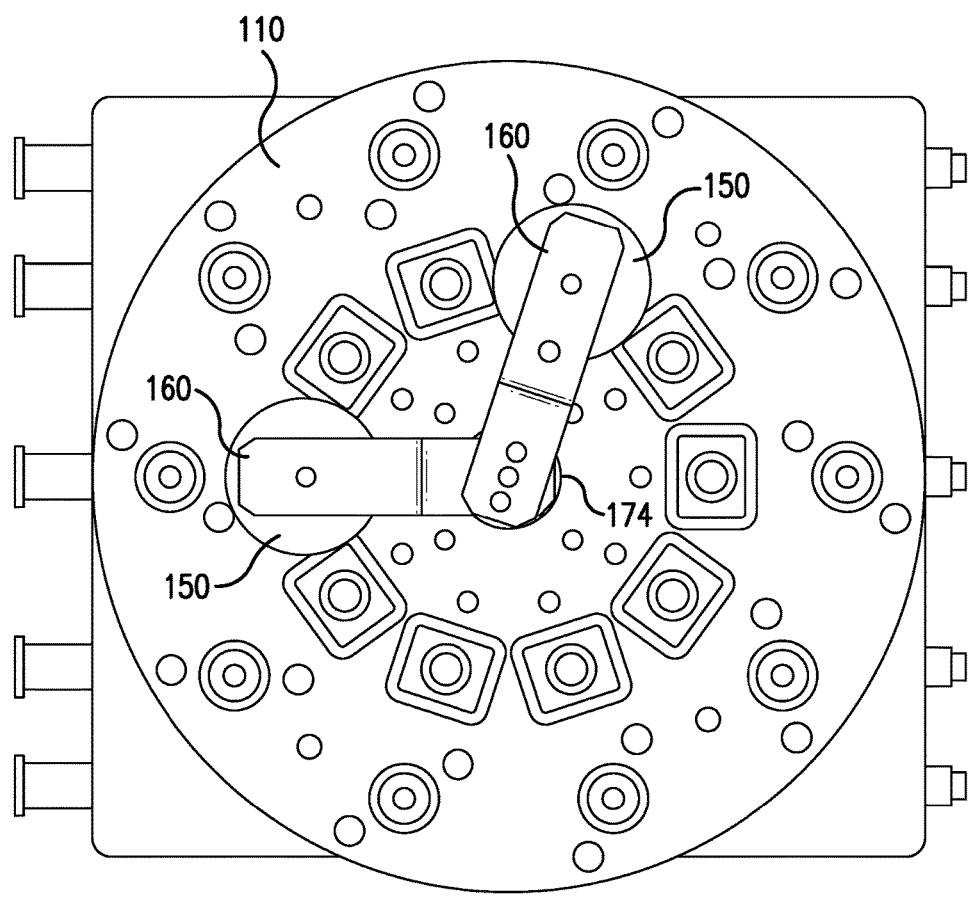

FIG. 9 is a top view of a beverage dispensing valve system according to various aspects of the invention.

Figure 10:
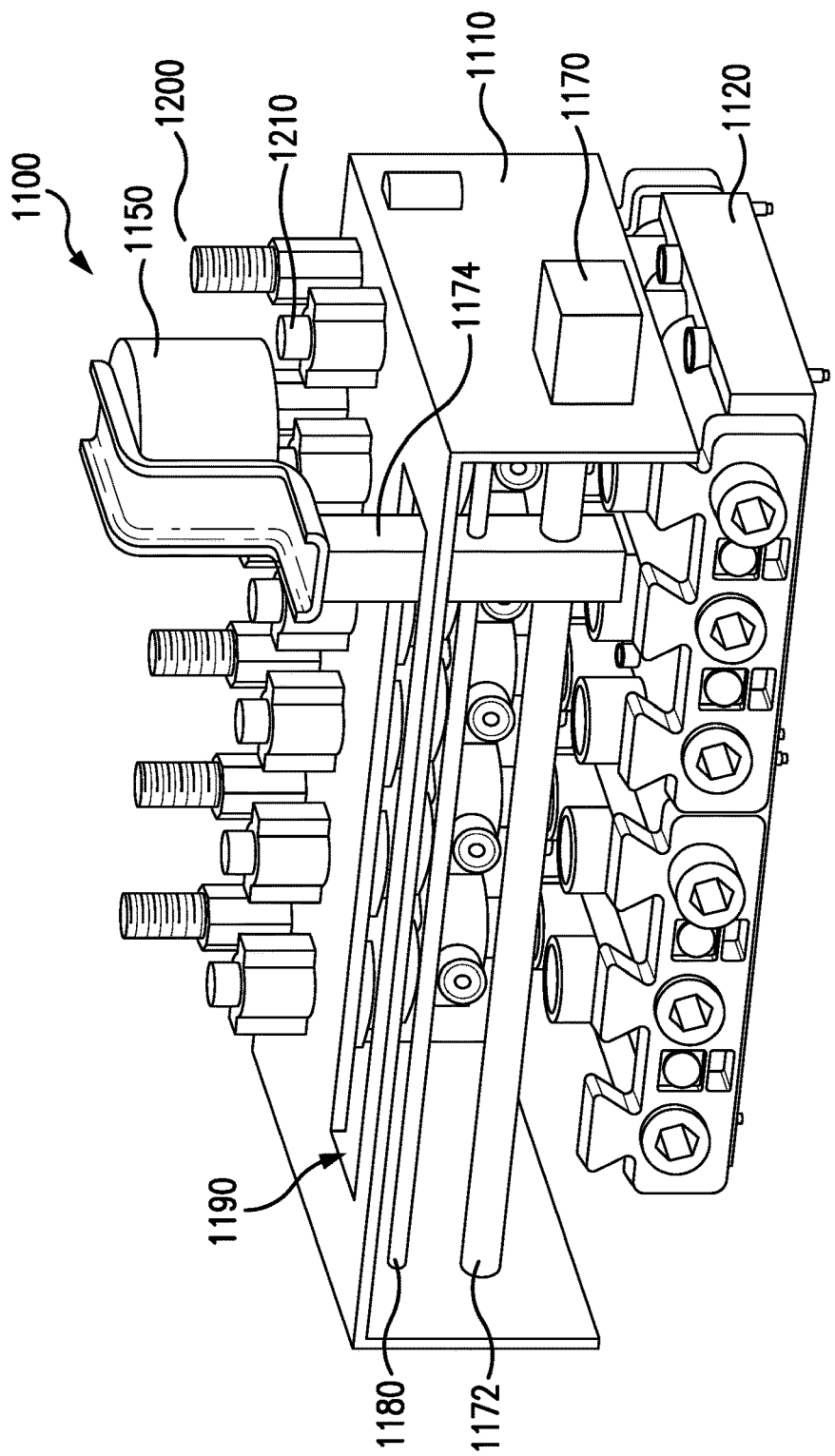

FIG. 10 is a perspective view of a beverage dispensing valve system according to various aspects of the invention.

Figure 11:
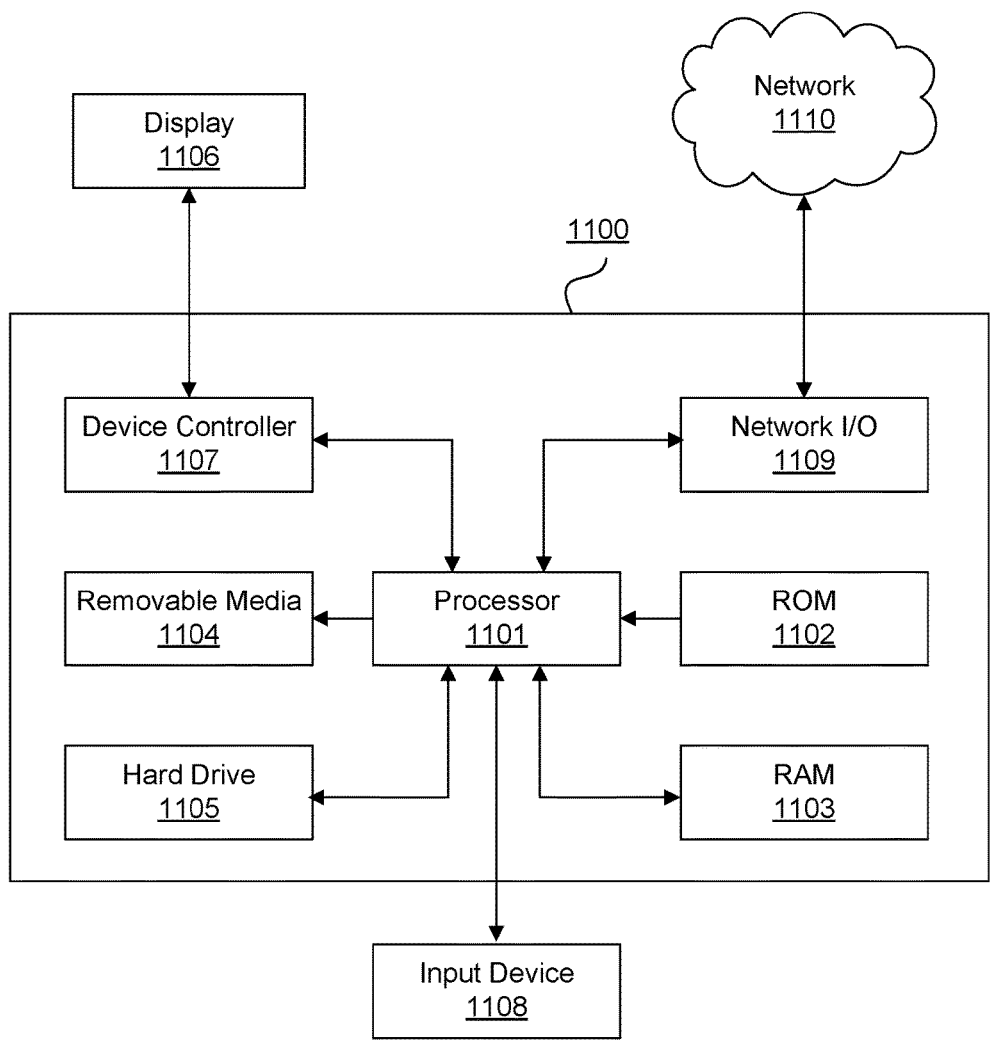

FIG. 11 illustrates an example hardware platform according to various aspects of the invention.

Figure 12:
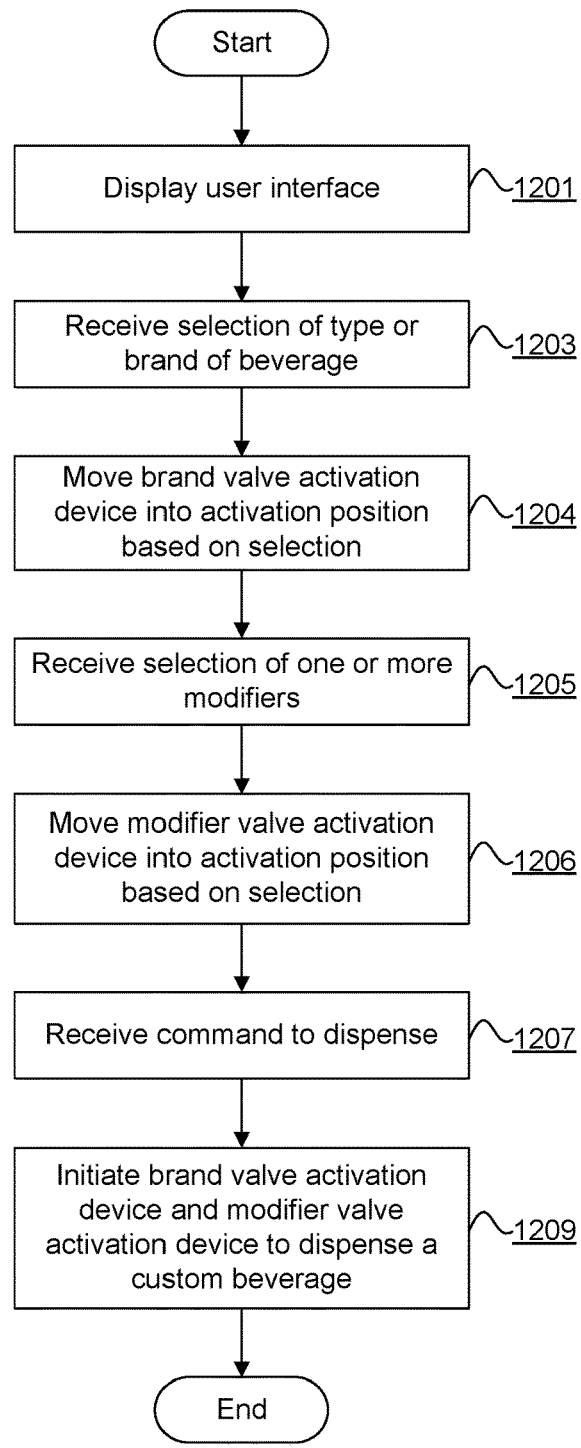

FIG. 12 is a block diagram of an example method for dispensing a beverage according to various aspects of the invention.

Figure 13:
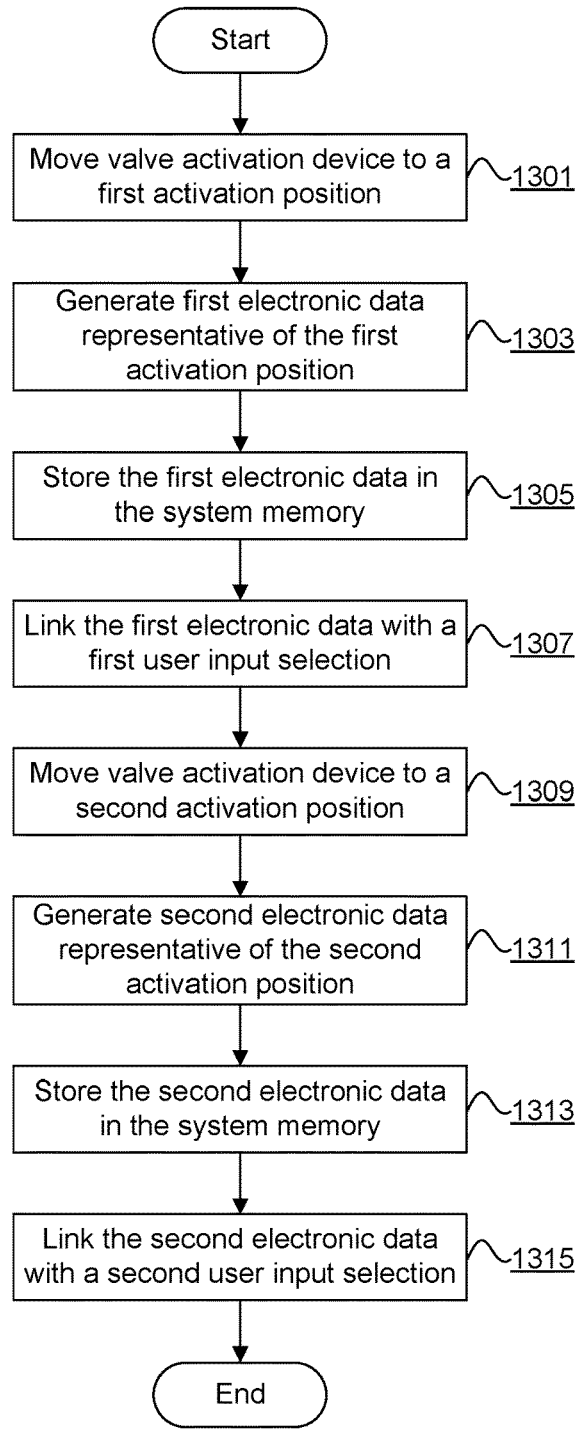

FIG. 13 is a block diagram of an example method for indexing a movable valve activation device according to various aspects of the invention.

Figure 14:
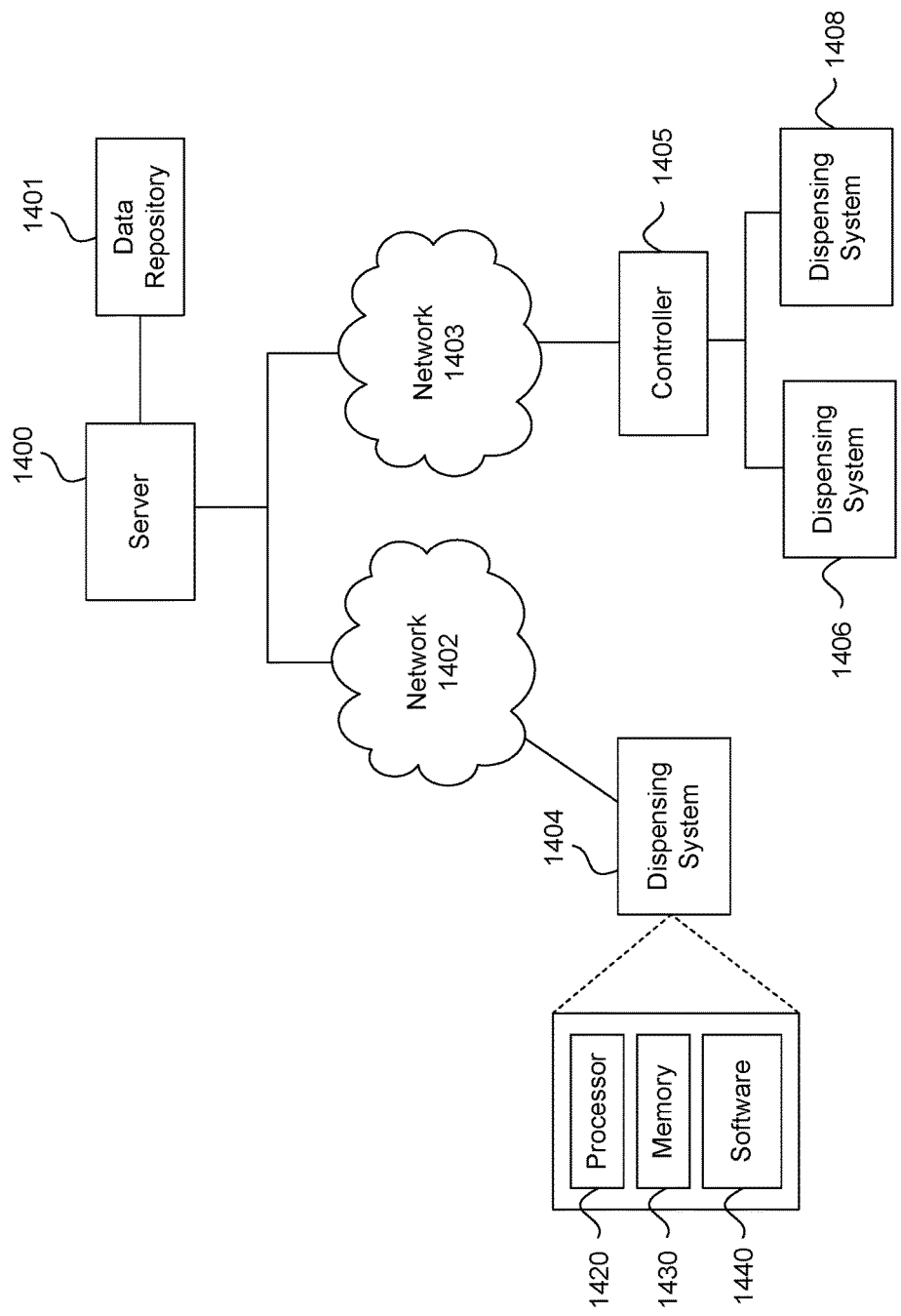

FIG. 14 is a block diagram of an example communication network according to various aspects of the invention.

Features and advantages of the embodiments will become more apparent from the detailed description set forth below when taken in conjunction with the drawings, in which like reference characters identify corresponding elements throughout.

DETAILED DESCRIPTION OF THE INVENTION

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In one aspect of the invention, a beverage dispensing valve system utilizing a single activation method to dispense a fluid from one of multiple fluid sources is provided. The single activation method can reduce the number of solenoids or other activation devices resulting in lower cost and a smaller space requirement. The single activation method can move an activation device and index its position at one or more flow regulators in the beverage dispensing valve system to open and close fluid flow paths, as determined by a control system and user input. The activation device can be electronically indexed in a curved, circular, or linear arrangement. The activation device can be electrically powered or pneumatically powered. The response time of moving the activation device can be optimized through a control algorithm that incorporates user input on a touchscreen display. The control algorithm can allow the activation device to reach the desired flow regulator to control the respective fluid diluent or fluid concentrate in a timely manner. The beverage dispensing valve system can be used along with traditional (non-movable) electrical or pneumatic valve activation devices.

The embodiments discussed below may be used to form a wide variety of products, such as beverages, including but not limited to cold and hot beverages, and including but not limited to beverages known under any PepsiCo branded name, such as Pepsi-Cola®.

An aspect of the present invention will now be described with reference to FIGS. 1-13. Throughout the system, conventional beverage tubing (FDA approved for use with food products) is used to connect the components of the system. Any of the beverage tubing conduits may be insulated to prevent heat loss or gain. In the beverage dispensing system 10, a diluent source supplies diluent, e.g., water, to the system 10. In one aspect, the diluent can be at typical domestic water pressures, e.g., approximately 50-300 pounds per square inch (psi). Beverage dispensing system 10 can include a nozzle assembly 40. Beverage liquid concentrate can be supplied to beverage dispensing system 10 and can mix with the diluent at nozzle 40. The use of a post-mix system that directly mixes the concentrate and diluent at the nozzle avoids cross-contamination of multiple concentrate sources and can reduce the unwanted growth of bacteria within the beverage system.

Figure 1:
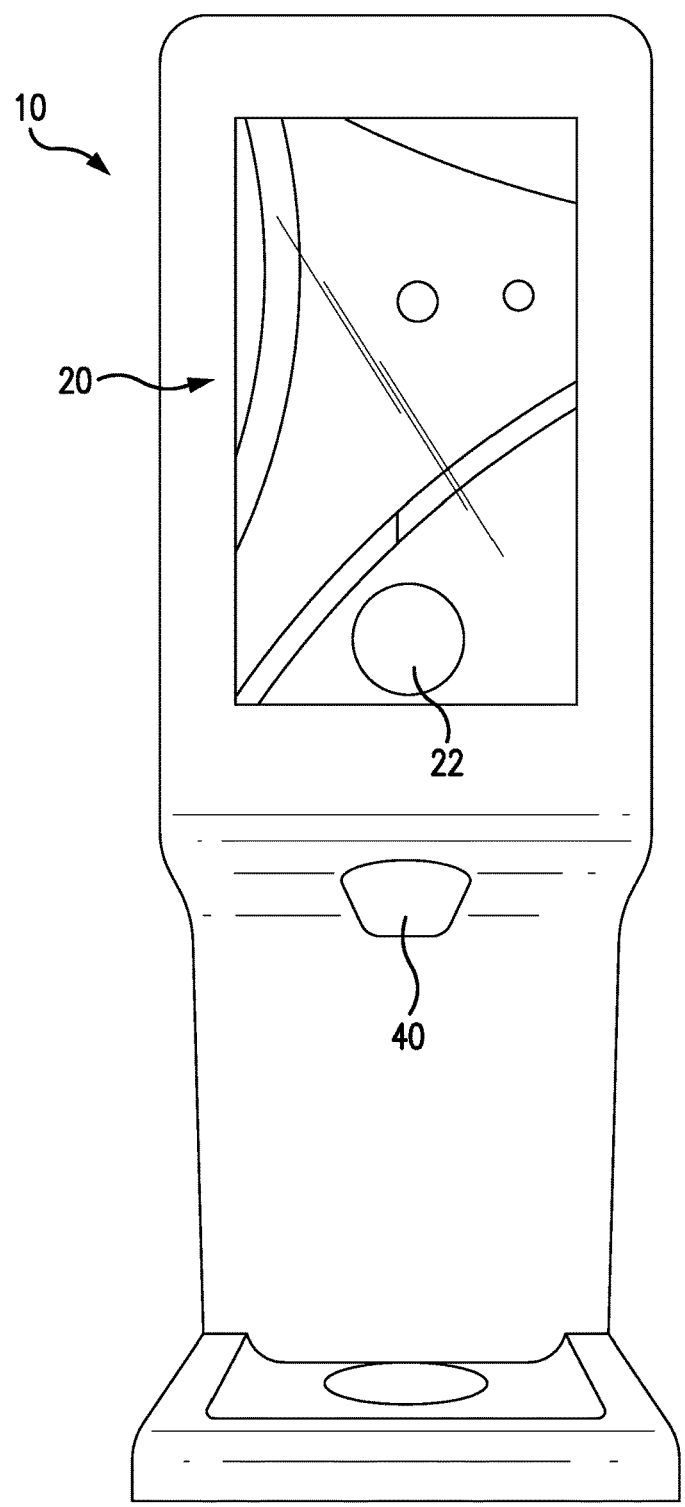
FIG. 1 is a front view of a beverage dispensing system according to various aspects of the invention.
Figure 2:
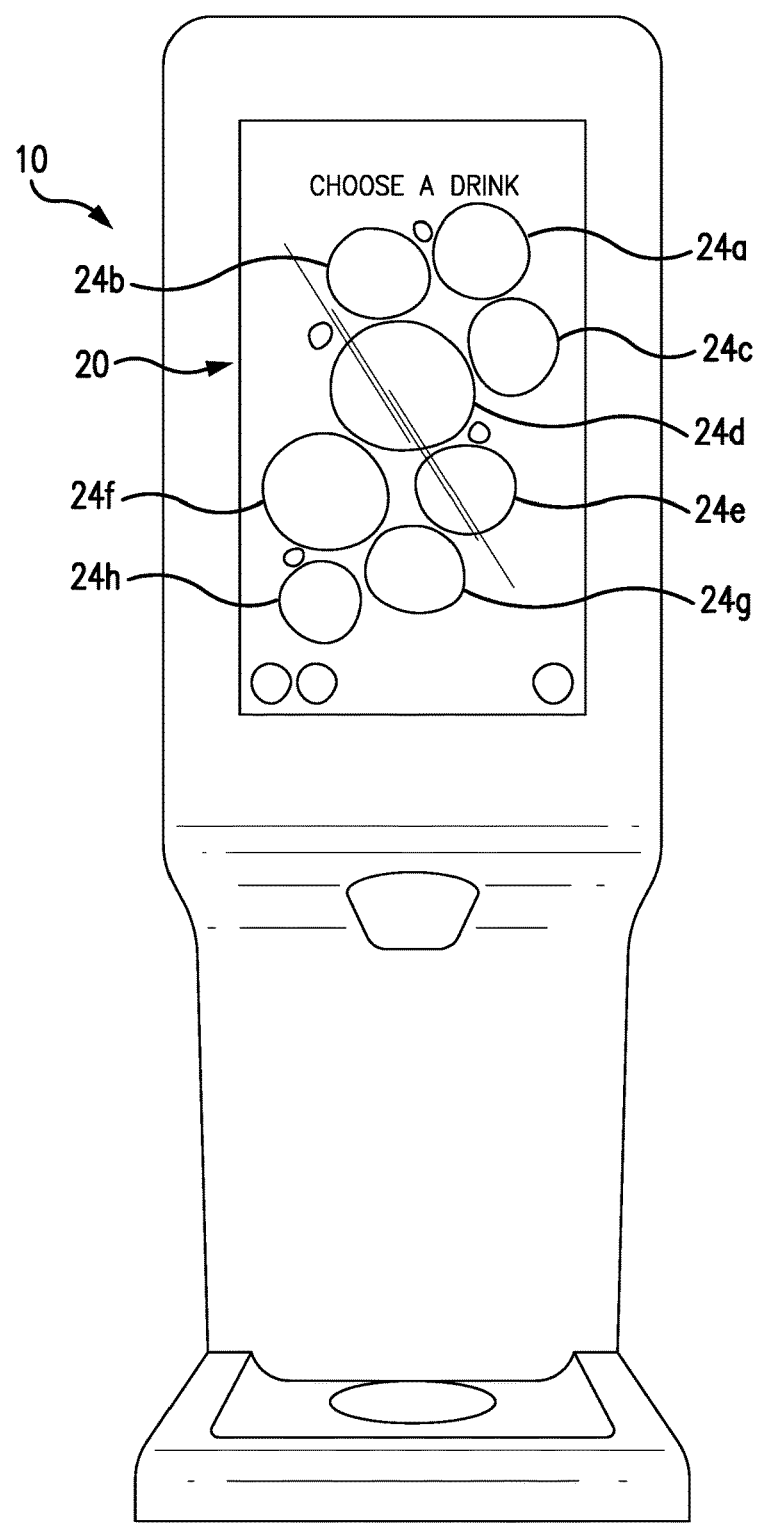
FIG. 2 is a front view of a beverage dispensing system according to various aspects of the invention.
Figure 3:
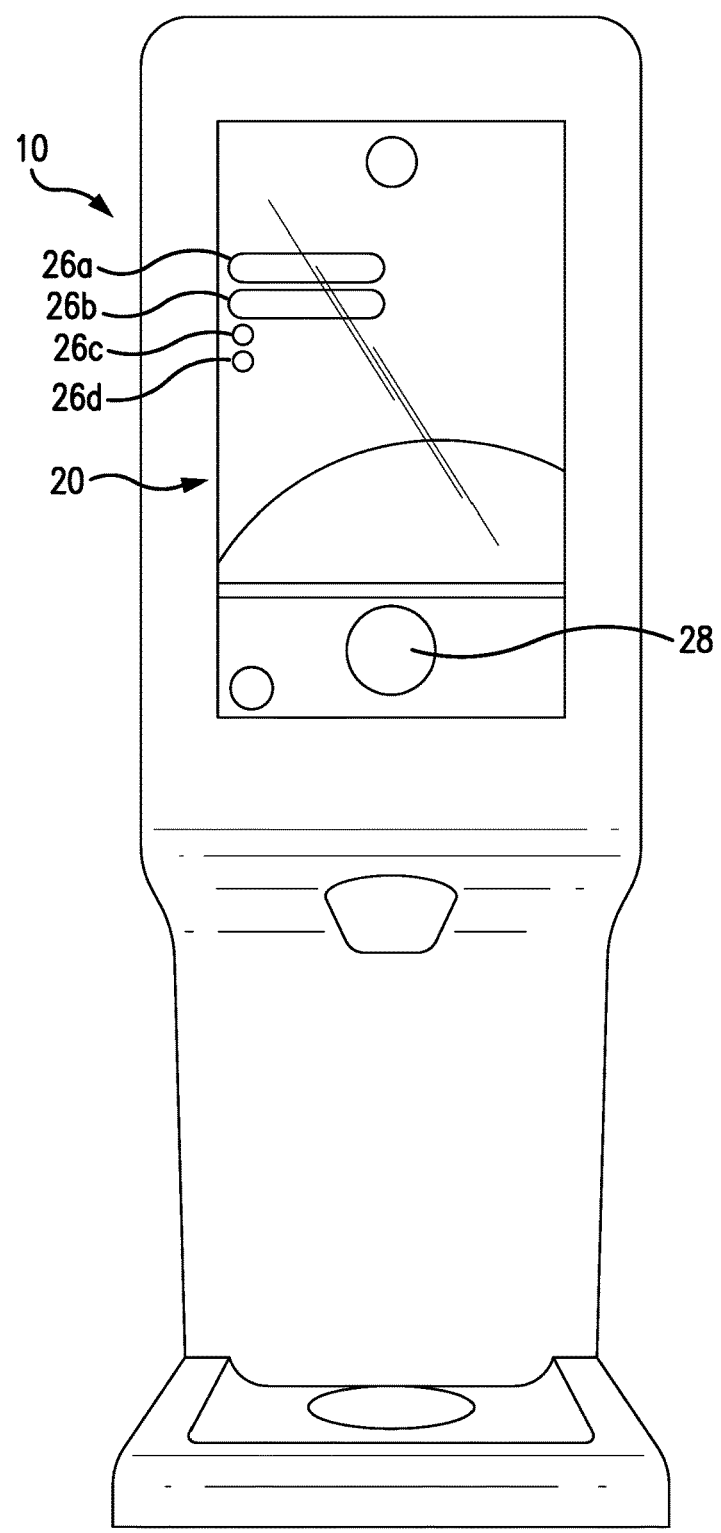
FIG. 3 is a front view of a beverage dispensing system according to various aspects of the invention.

FIGS. 1-3 illustrate beverage dispensing system 10, a touch screen display 20, and example user input selections 22, 24a-24h, 26a-26d, and 28 that can be used as part of a user interface on touch screen display 20. In particular, FIGS. 1-3 show different displays for an example embodiment of a user interface for beverage dispensing system 10. A user may make desired selections, such as selections of a desired brand of beverage and one or more modifiers or flavorings that can be used as ingredients for a custom beverage. Touch screen display 20 can present all information required to select and dispense a custom beverage to a user. As shown in FIG. 2, user input selections 24a-24f can be icons for each type or brand of beverage that are available at the beverage dispensing system. User input selections 24a-24f can be displayed on display screen 20. In one aspect of the invention, user input selection 24a can be an icon for Sierra Mist®, user input selection 24b can be an icon for Tropicana®, user input selection 24c can be an icon for Diet Pepsi-Cola®, user input selection 24d can be an icon for Pepsi-Cola®, user input selection 24e can be an icon for Lipton Brisk® Iced Tea, user input selection 24f can be an icon for Mountain Dew®, user input selection 24g can be an icon for Diet Mountain Dew®, and user input selection 24h can be an icon for MUG Root Beer®.

As shown in FIG. 3, user input selections 26a-26d can be icons for each beverage modifier or flavoring that are available at beverage dispensing system 10. User input selections 26a-26d can be displayed on display screen 20. In one aspect of the invention, user input selection 26a can be an icon for cherry flavoring, user input selection 26b can be an icon for vanilla flavoring, user input selection 26c can be an icon for strawberry flavoring, and user input selection 26d can be an icon for lemon flavoring.

Beverage dispensing system 10 can include a beverage dispensing valve system 100. Beverage dispensing valve system 100 and its components are shown in FIGS. 4-8. In one aspect of the invention, beverage dispensing valve system 100 can include a top plate 110, a back block 120, and a back block mounting bracket 130. Top plate 110 can be attached to back block 120 with support rods 140 that can extend from a bottom surface of top plate 110 to a top surface of back block 120.

Beverage dispensing valve system 100 can include one or more flow regulators 200. Flow regulators 200 can be attached to top plate 110 and back block 120 in beverage dispensing valve system 100. Each flow regulator 200 can be fluidly connected to a fluid source to control flow of that fluid through the flow regular 200 and ultimately the beverage dispensing system 10. The fluid sources can be diluents, e.g., water, carbonated water, low carbonated water, and high carbonated water. The discrete fluid sources can also be concentrates, e.g., beverage concentrates including brand concentrates and flavor concentrates. In one aspect, beverage dispensing valve system 100 can include two flow regulators 200. In another aspect, beverage dispensing valve system 100 can include more than two flow regulators 200, for example: three flow regulators 200, four flow regulators 200, five flow regulators 200, six flow regulators 200, seven flow regulators 200, eight flow regulators 200, nine flow regulators 200, 10 flow regulators 200, 11 flow regulators 200, 12 flow regulators 200, 13 flow regulators 200, 14 flow regulators 200, 15 flow regulators 200, and 16 flow regulators 200. In one aspect, beverage dispensing valve system 100 can include a flow regulator 200 for a brand concentrate, a flow regulator 200 for a diluent, and a flow regulator 200 for a flavor concentrate. Flow regulators 200 can control and adjust the quantity of flow of fluid. Plunger 240 can block fluid flow through back block 120 during servicing and can allow liquid flow through back block 120 in normal operating conditions.

Figure 4:
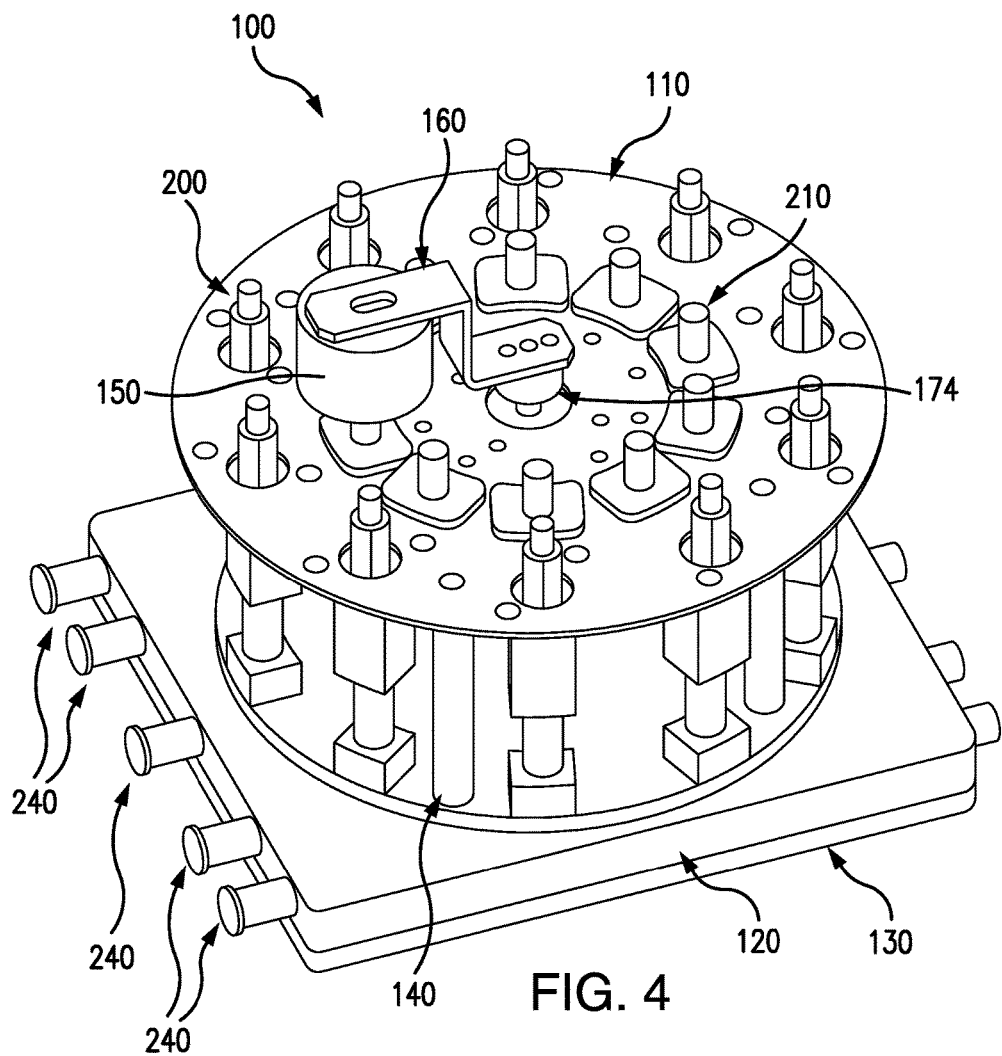
FIG. 4 is a perspective view of a beverage dispensing valve system according to various aspects of the invention.

In one aspect of the invention, the flow regulators 200 can be arranged in a curved arrangement on top plate 110 and back block 120 about central axis 60. In another aspect of the invention, the flow regulators 200 can be arranged in a circular or semi-circular arrangement on top plate 110 and back block 120 about central axis 60, for example, as shown in FIGS. 4-6. In one aspect of the invention, the angular displacement 201 between adjacent flow regulators 200 with respect to central axis 60 can be approximately 20 degrees. In another aspect, the angular displacement 201 between adjacent flow regulators can range from approximately 18 degrees to approximately 180 degrees. For example, the angular displacement 201 can be approximately 180 degrees, approximately 120 degrees, approximately 90 degrees, approximately 72 degrees, approximately 60 degrees, approximately 51 degrees, approximately 45 degrees, approximately 40 degrees, approximately 36 degrees, approximately 33 degrees, approximately 30 degrees, approximately 28 degrees, approximately 26 degrees, approximately 24 degrees, approximately 23 degrees, approximately 22 degrees, approximately 20 degrees, approximately 19 degrees, and approximately 18 degrees. In a further aspect, flow regulators 200 can be arranged in a linear arrangement on top plate 110 and back block 120.

Each flow regulator 200 can include a flow valve 210 that is movable between a fully-opened and a fully-closed position. In addition, each flow valve 210 can contain an orifice restriction of a predetermined size to meter the flow of liquid therethrough. For example, based on the relative sizes of the orifice restrictions of the valves, the correct proportion of the fluid can be maintained regardless of the incoming pressure. Flow valves 210 can be moved between the fully opened and the fully-closed positions by a valve activation device 150. In one aspect of the invention, valve activation device 150 can be pneumatic, for example, $CO_2$, $N_2$, compressed air, etc. In another aspect, valve activation device 150 can be an electronic solenoid. In this aspect, flow valves 210 can each include a core 211 that is contained in a sleeve 212. A spring 214 can bias core 211 to a fully closed position to block fluid flow into flow channel 216. The electronic solenoid in valve activation device 150 can be energized to create a magnetic field and pull core 211 upward to permit fluid flow into flow channel 216. In one aspect of the invention, the electronic solenoid in valve activation device 150 can be energized based on a user input on a user interface of a beverage dispensing system 10.

In one aspect of the invention, valve activation device 150 can be movable. For example, valve activation device 150 can move to an activation position adjacent a flow valve 210 in a flow regulator 200 to open flow valve 210 to dispense a fluid. For example, as shown in FIG. 6, valve activation device 150 can move to a first activation position adjacent flow valve 210a to open flow valve 210a, a second activation position adjacent flow valve 210b to open flow valve 210b, a third activation position adjacent flow valve 210c to open flow valve 210c, a fourth activation position adjacent flow valve 210d to open flow valve 210d, a fifth activation position adjacent flow valve 210e to open flow valve 210e, a sixth activation position adjacent flow valve 210f to open flow valve 210f, a seventh activation position adjacent flow valve 210g to open flow valve 210g, an eighth activation position adjacent flow valve 210h to open flow valve 210h, a ninth activation position adjacent flow valve 210i to open flow valve 210i, and a 10th activation position adjacent flow valve 210j to open flow valve 210j. In one aspect of the invention, valve activation device 150 can move to one of the activation positions based on a user input on a user interface of a beverage dispensing system 10.

In an aspect of the invention, valve activation device 150 can be attached to a rotating arm 160. Rotating arm 160 can be attached to a coupling 174 that is also attached to a motor shaft 172. Motor 170 can rotate motor shaft 172, which rotates valve activation device 150 through rotation arm 160 to the activation position adjacent a flow valve 210. In one aspect of the invention, motor shaft 172 can define central axis 60. In a further aspect, motor 170 can be an electric stepper motor. In one aspect, motor 170 can rotate motor shaft 172 based on a user input on a user interface of a beverage dispensing system 10.

The respective positions of the motor shaft 172 and valve activation device 150 that correlate with the activation positions can be indexed and saved into a system memory, as discussed below with respect to FIG. 12. In one aspect, motor 170 can include a motor position sensor (not shown) to determine the positions of the motor shaft. Electronic data from the motor position sensor can be used to index the respective positions of the motor shaft 172 and valve activation device 150. In another aspect, the beverage dispensing valve system can include a valve activation device position sensor (not shown) to determine the positions of the motor shaft and valve activation device 150. Electronic data from the valve activation device position sensor can be used to index the respective positions of the motor shaft 172 and valve activation device 150.

Valve activation device 150 can be controlled by an electronic control module that includes a programmable microprocessor that sends an electronic signal to position and initiate the valve activation device 150. The electronic control module can provide intelligent control of the beverage system. The electronic control module can control the position of valve activation device 150 through control of motor 170. The electronic control module can send a signal to motor 170 to move valve activation device 150 to an activation position adjacent a flow valve 210. For example, the electronic control module can send a signal to motor 170 to move valve activation device 150 to a first activation position adjacent flow valve 210a, a second activation position adjacent flow valve 210b, a third activation position adjacent flow valve 210c, a fourth activation position adjacent flow valve 210d, a fifth activation position adjacent flow valve 210e, a sixth activation position adjacent flow valve 210f, a seventh activation position adjacent flow valve 210g, an eighth activation position adjacent flow valve 210h, a ninth activation position adjacent flow valve 210i, and a 10th activation position adjacent flow valve 210j. In one aspect, the electronic control module can send a signal to motor 170 to move valve activation device 170 to a particular activation position based on a user input on a user interface of a beverage dispensing system 10, as discussed in greater detail below.

The electronic control module can also control initiation of valve activation device 150. In one aspect, the electronic control module can send a signal to valve activation device 150 to open a flow valve 210 to dispensing a fluid. In another aspect, the electronic control module can send a signal to energize a solenoid in valve activation device 150 to create a magnetic field and dispense a fluid by pulling core 211 upward to open a flow valve 210 and permit fluid flow into flow channel 216. In one aspect, the electronic control module can send a signal to initiate valve activation device 150 based on a user input on a user interface of a beverage dispensing system 10, as discussed in greater detail below.

The electronic control module can also monitor system status such as the fluid temperatures, number of drinks dispensed, and sensors that determine the amount of concentrate remaining in the beverage dispensing system. The electronic control module can also provide service diagnostics, and the ability to remotely poll the electronic status.

In another aspect of the invention, beverage dispensing valve system 100 can include two valve activation devices 150 as shown in FIG. 9. For example, motor 170 could be a dual motor having two motor shafts 170. In one aspect, the two motor shafts 170 can be co-axial. Each motor shaft 170 can be attached to a rotating arm 160 and each rotating arm 160 can be attached to a valve activation device 150. In this manner, a single beverage valve system 100 can simultaneously open multiple flow valves 210 to simultaneously dispense two fluids.

In another aspect, flow regulators 200 can be positioned in a linear arrangement on beverage dispensing valve system 100. In this aspect, coupling 174 can include a four-bar linkage to translate the rotary motion of motor 170 into linear motion of valve activation device 150.

In a further aspect as shown in FIG. 10, a linear actuator 1170 can move valve activation device 1150 along a linear arrangement of flow regulators 1200 and flow valves 1210. A vertical post 1174 of valve activation device 1150 can move along a rail 1180 and lead screw 1172. In one aspect, vertical post 1174 can extend through opening 1190 in top plate 1110 attached to back block 1120.

In one aspect of the invention, the positions of motor shaft 172 and valve activation device 150 can be indexed with the positions of the respective flow valves 210 as activation positions. The activation positions can be linked with user input selections, as shown in FIG. 13.

At step 1301, a beverage dispensing valve system, e.g., beverage dispensing valve system 100, may be provided. The beverage dispensing valve system can include flow regulators and flow valves, e.g., flow regulators 200a-j and flow valves 210a-i, positioned about the beverage dispensing valve system. A valve actuation device, e.g., valve actuation device 150, can be attached to an electric motor, e.g., motor 170, and can be moved to a first activation position, e.g., a position where the valve activation device is adjacent the flow regulator and can open the flow regulator flow valve.

At step 1303, first electronic data representative of the first activation position can be generated. The first electronic data can be derived from the electric motor and can represent where the motor should turn the motor shaft, e.g., motor shaft 172, to move the valve actuation device to the first activation position. In one aspect, the electric motor can include a motor position sensor to determine the position of the motor shaft. The first electronic data can be derived from electronic data generated by the motor position sensor. In another aspect, the beverage dispensing valve system can include a valve activation device position sensor to determine the position of the valve activation device. The first electronic data can be derived from electronic data generated by the valve activation device position sensor.

At step 1305, the first electronic data can be stored in a memory of a beverage dispensing system, e.g., beverage dispensing system 10, utilizing the beverage dispensing valve system.

At step 1307, the first electronic data can be linked with a first user input selection. Based on this linking, the motor can move the valve activation device to the first activation position upon receiving a user input that identifies the first user input selection. In one aspect, the first user input selection can be a type or brand of beverage, such as one of user input selections 24a-24h. In another aspect, the first user input selection can be a beverage modifier, such as one of user input selections 26a-26d. In a further aspect, the first user input selection can be related to a type of diluent, such as water, carbonated water, low carbonated water, and high carbonated water.

At step 1309, the valve actuation device can be moved to a second activation position, e.g., a position where the valve activation device is adjacent a second flow regulator and can open the second flow regulator flow valve.

At step 1311, second electronic data representative of the second activation position can be generated. The second electronic data can be derived from the electric motor and can represent where the motor should turn the motor shaft, e.g., motor shaft 172, to move the valve actuation device to the second activation position. In one aspect, the first electronic data can be derived from electronic data generated by the motor position sensor. In another aspect, the first electronic data can be derived from electronic data generated by the valve activation device position sensor.

At step 1313, the first electronic data can be stored in a memory of the beverage dispensing system.

At step 1315, the second electronic data can be linked with a second user input selection. Based on this linking, the motor can move the valve activation device to the second activation position upon receiving a user input that identifies the second user input selection. In one aspect, the second user input selection can be a type or brand of beverage, such as one of user input selections 24a-24h. In another aspect, the second user input selection can be a beverage modifier, such as one of user input selections 26a-26d. In a further aspect, the second user input selection can be related to a type of diluent, such as water, carbonated water, low carbonated water, and high carbonated water.

The above indexing method can be repeated for each activation position of motor shaft 172 and valve activation device 150 with respect to each flow regulator 200 and flow valve 210. For example, the indexing method can include moving the valve activation device to a third activation position, generating third electronic data representative of the third activation position, storing the third electronic data in the beverage dispensing system memory, and linking the third electronic data with a third user input selection. The indexing method can include moving the valve activation device to a fourth activation position, generating fourth electronic data representative of the fourth activation position, storing the fourth electronic data in the beverage dispensing system memory, and linking the fourth electronic data with a fourth user input selection. The indexing method can include moving the valve activation device to a fifth activation position, generating fifth electronic data representative of the fifth activation position, storing the fifth electronic data in the beverage dispensing system memory, and linking the fifth electronic data with a fifth user input selection. The indexing method can include moving the valve activation device to a sixth activation position, generating sixth electronic data representative of the sixth activation position, storing the sixth electronic data in the beverage dispensing system memory, and linking the sixth electronic data with a sixth user input selection.

Although the example method of FIG. 13 shows a particular order of steps, the exact order of the above steps could change, and the beverage dispensing valve system could receive or generate additional electronic data before, after, and in between particular steps of the above example method.

The manner in which a user engages the interface of the beverage dispensing system to select and/or dispense a beverage can vary. FIG. 12 illustrates an example method for dispensing an available product according to one aspect of the invention.

At step 1201, a user interface may be displayed on a display device of the dispenser. This may include displaying an initial user input selection 22 on display screen 20 (e.g., "touch to start").

At step 1203, a selection of a type or brand of beverage may be received via input from the user. For example, a user may select Sierra Mist® by selecting user input selection 24a, Tropicana® by selecting user input selection 24b, Diet Pepsi-Cola® by selecting user input selection 24c, Pepsi-Cola® by selecting user input selection 24d, Lipton Brisk® Iced Tea by selection user input selection 24e, Mountain Dew® by selecting user input selection 24f, Diet Mountain Dew® by selecting user input selection 24g, or MUG Root Beer® by selecting user input selection 24h.

At step 1204, based on the user input in step 1203, an electronic control module can send a signal to a motor in a brand beverage dispensing valve system, e.g., beverage dispensing valve system 100, to move a valve activation device, e.g., valve activation device 150, to a position adjacent a flow valve, e.g., flow valve 210, in a flow regulator, e.g., flow regulator 200. The beverage dispensing valve system can include a flow regulator, e.g., 200a-200h, for each user input selection, e.g., 24a-24h.

At step 1205, a selection of one or more modifiers to a beverage may be received via input from the user. For example, a user may select flavoring by pressing one or more of user input selections 26a-26d. A user can select cherry flavoring by selecting user input selection 26a, a user can select vanilla flavoring by selecting user input selection 26b, a user can select strawberry flavoring by selecting user input selection 26c, and a user can select lemon flavoring by selecting user input selection 26d. In response to a selection, the interface can highlight the selected icon to indicate the selected flavoring to be added.

At step 1206, based on the user input in step 1205, an electronic control module can send a signal to a motor in a modifier beverage dispensing valve system, e.g., beverage dispensing valve system 100, to move a valve activation device, e.g., valve activation device 150, to a position adjacent a flow valve, e.g., flow valve 210, in a flow regulator, e.g., flow regulator 200. The beverage dispensing valve system can include a flow regulator, e.g., 200a-200d, for each user input selection, e.g., 26a-26d. In one aspect of the invention, the modifier beverage dispensing valve system and the brand beverage dispensing valve system can be a single dual beverage dispensing valve system. In this aspect, the dual beverage dispensing valve system can include a brand activation device and a modifier activation device that move independently and can simultaneously dispense multiple fluids.

At step 1207, a command to dispense the custom beverage may be received via input from the user. For example, a user may select user input selection 28 (e.g., a pour icon) to dispense the custom beverage.

At step 1209, the interface can send electronic signals to the valve activation device in the brand beverage valve system and the valve activation device in the modifier beverage valve system to cause the dispenser to dispense the custom beverage as a mixture of the type or brand of beverage selected at step 1203 and the selected modifiers from step 1205. For example, as a response to the actuation of user input selection 28, the interface may illuminate user input selection 28 and cause the dispenser to dispense the selected mixture.

Although the example method of FIG. 12 shows a particular order of steps, the exact order of the above steps could change (e.g., step 1205 could occur prior to step 1203), and the dispenser could receive additional input from the user before, after, and in between particular steps of the above example method. The order of the steps and/or what input is received during the course of a user's interaction with a dispenser may be dependent on the organization of the user interface.

In a further aspect, non-movable activation devices can be utilized with the brand beverage dispensing valve system and/or the modifier beverage dispensing valve system. In another aspect, non-movable valve activation devices can be used in place of the brand beverage dispensing valve system and/or the modifier beverage dispensing valve system.

FIG. 14 illustrates a block diagram of an example communication network in which one or more embodiments may be implemented. A dispensing system, e.g., beverage dispensing system 10, can be configured to dispense a product according to a user's selection. For example, a user can approach a dispenser 1404, and interact with the dispenser 1404 to make a selection (e.g., input a code or press a button corresponding to the desired product). In response, the dispenser 1404 may dispense the selected product. In general, examples of this disclosure relate to a beverage dispensing system; however, various aspects of this disclosure could be used in a dispenser for other types of products (e.g., candy or snack dispenser).

Dispensing systems may be located across different locations or premises. For example, FIG. 14 illustrates three dispensers: dispensing system 1404, dispensing system 1406 and dispensing system 1408.

In a further aspect, dispensing systems may be connected to a controller. A controller may be centrally located and/or a separate controller may be incorporated into each dispenser. As illustrated in FIG. 14, dispensing systems 1406 and 1408 are connected to controller 1405. Controller 1405 can be configured to receive instructions from dispensing system 1406 and/or 1408, and to cause the appropriate dispensing system to dispense an appropriate amount of the selected product. For example, if dispensing system 1406 is a beverage dispenser, a user may interact with the dispenser to select a beverage (e.g., via a touchpad, touch screen, keypad, etc.), instructions for the selected beverage may be transmitted to controller 1405, and controller 1405 may be configured to dispense an appropriate amount of the selected beverage in response to the instructions.

Components of a dispensing system may include a processor 1420, memory 1430, software 1440, and/or additional components suitable for implementing the functions and methods of the dispensing system. Software 1440 may be stored in computer-readable memory 1430 such as read only or random access memory in dispenser 1404 and may include instructions that cause one or more components (e.g., processor 1420, display, etc.) of a dispenser (e.g., dispenser 1404) to perform various functions and methods including those described herein.

A dispenser may communicate with other devices using one or more networks. For example, as illustrated in FIG. 14, dispensing systems 1404, 1406 and 1408 may communicate with server 1400 via network 1402 and/or network 1403. Network 1402 and network 1403 may include multiple networks that are interlinked so as to provide internetworked communications. Such networks may include one or more private or public packet-switched networks (e.g., the Internet), one or more private or public circuit-switched networks (e.g., a public switched telephone network), a cellular network, a short or medium range wireless communication connection (e.g., Bluetooth®, ultra wideband (UWB), infrared, WiBree, wireless local area network (WLAN) according to one or more versions of Institute of Electrical and Electronics Engineers (IEEE) standard no. 802.11), or any other suitable network. Devices in communication with each other (e.g., dispensing systems 1404, 1406, and 1408, server 1400, and/or data repository 1401) may use various communication protocols such as Internet Protocol (IP), Transmission Control Protocol (TCP), Simple Mail Transfer Protocol (SMTP), File Transfer Protocol (FTP), among others known in the art.

Server 1400, controller 1405, and dispensing systems 1404, 1406 and 1408 may be configured to interact with each other and other devices. In one example, dispenser 1404 may include software 1440 that is configured to coordinate the transmission and reception of information to and from server 1400. In one arrangement, software 1440 may include application or server specific protocols for requesting and receiving data from server 1400. For example, software 1440 may comprise a browser or variants thereof and server 1400 may comprise a web server. In some arrangements, server 1400 may transmit application data to dispensing systems, such as software updates to various components of the dispensing system (e.g., updates to the user interface, updates to firmware of the dispensing system, updates to drivers of the dispensing system, etc.). In one or more arrangements, server 1400 may receive data from the dispensing systems, such as data describing the current stock of the dispenser (e.g., a listing of products and the number remaining at the dispenser), operation history and/or usage metrics of the dispenser (e.g. counters tracking the selections of users of the machine), status of the dispenser (e.g., whether any components are working improperly), etc. Server 1400 may be configured to access and store data in data repository 1401, such as data that it receives and transmits in data repository 1401. Data repository 1401 may also include other data accessible to server 1400, such as different drink recipes that can be downloaded to dispensers.

FIG. 11 illustrates an example computing device on which at least some of the various elements described herein can be implemented, including, but not limited to, various components of dispenser systems (e.g., dispensers 1004, 1006 and 1008, beverage dispensing system 11). Computing device 1100 may include one or more processors 1101, which may execute instructions of a computer program to perform, or cause to perform, any of the steps or functions described herein. The instructions may be stored in any type of computer-readable medium or memory, to configure the operation of the processor 1101. For example, instructions may be stored in a read-only memory (ROM) 1102, random access memory (RAM) 1103, removable media 1104, such as a Universal Serial Bus (USB) drive, compact disk (CD) or digital versatile disk (DVD), floppy disk drive, flash card, or any other desired electronic storage medium. Instructions may also be stored in an attached (or internal) hard drive 1105.

Computing device 1100 may include one or more output devices, such as a display 1106, and may include one or more output device controllers 1107, such as a video processor. There may also be one or more user input devices 1008, such as a touch screen, remote control, keyboard, mouse, microphone, card reader, RFID reader, etc. The computing device 1100 may also include one or more network interfaces, such as input/output circuits 1109 to communicate with an external network 1110. The network interface may be a wired interface, wireless interface, or a combination of the two. In some embodiments, the interface 1109 may include a modem (e.g., a cable modem), and network 1110 may include the communication lines of the networks illustrated in FIG. 10, or any other desired network.

The FIG. 11 example is an illustrative hardware configuration. Modifications may be made to add, remove, combine, divide, etc. components as desired. Additionally, the components illustrated may be implemented using basic computing devices and components, and the same components (e.g., processor 1101, storage 1102, user input device 1108, etc.) may be used to implement any of the other computing devices and components described herein.

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory. RAM, etc. The functionality of the program modules may be combined or distributed as desired in various embodiments. In addition, the functionality may be embodied in whole or in part in firmware or hardware equivalents such as integrated circuits, field programmable gate arrays (FPGA), controllers, application-specific integrated circuits (ASICS), combinations of hardware/firmware/software, and the like. Particular data structures may be used to more effectively implement one or more aspects of the invention, and such data structures are contemplated within the scope of computer executable instructions and computer-usable data described herein.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventor(s), and thus, are not intended to limit the present invention(s) and the appended claims in any way.

The present invention(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention(s) should not be limited by any of the above-described exemplary embodiments, but should be defined only in accordance with the following claims and their equivalents.

What is claimed is:

1. A beverage dispensing valve system comprising:
   a first liquid inlet connected to a first liquid source and a first liquid flow path;
   a second liquid inlet connected to a second liquid source and a second liquid flow path;
   a first flow regulator having a first core positioned in the first liquid flow path to open and close the first liquid flow path from the first liquid inlet to a first liquid outlet;
   a second flow regulator having a second core positioned in the second liquid flow path to open and close the second liquid flow path from the second liquid inlet to a second liquid outlet; and
   a movable valve activation device including:
      a motor having an upwardly-extending motor shaft extending along a central axis of the beverage dispensing valve system;
      a rotary arm having a fixed end attached to the motor shaft and a free end extending radially outward from the fixed end, wherein the free end is positioned vertically above the first core; and
      an electromagnet fixed to the free end of the rotary arm,
      wherein the movable valve activation device is movable to a first position adjacent the first core to attract the first core upwards to open the first liquid flow path and a second position adjacent the second core to attract the second core upwards to open the second liquid flow path, and
   wherein the electromagnet is energized in response to an electronic input signal to attract the first core or the second core upwards.

2. The beverage dispensing valve system of claim 1, wherein the motor moves the movable valve activation device to the first position or the second position in response to a first electronic input signal.

3. The beverage dispensing valve system of claim 1, wherein the shaft of the motor rotates to move the movable valve activation device to the first position or the second position, and
   wherein the shaft defines a rotation axis.

4. The beverage dispensing valve system of claim 1, wherein the motor rotates the movable valve activation device via the rotary arm.

5. The beverage dispensing valve system of claim 3, wherein an angular displacement between the first position and the second position is at least approximately 20 degrees about the rotation axis.

6. The beverage dispensing valve system of claim 3, wherein an angular displacement between the first position and the second position is from approximately 18 degrees to approximately 90 degrees about the rotation axis.

7. The beverage dispensing valve system of claim 1, further comprising:
   a third liquid inlet connecting to a third liquid source and a third liquid flow path; and
   a third liquid flow regulator having a third core positioned in the third liquid flow path to open and close the third liquid flow path from the third liquid inlet to a third liquid outlet,
   wherein the movable valve activation device is movable to a third position adjacent the third core to attract the third core upwards to open the third liquid flow path, and
   wherein the electromagnet is energized in response to the electronic input signal to attract the third core upwards.

8. The beverage dispensing valve system of claim 1, wherein the first fluid flow regulator includes a sleeve surrounding the first core and a spring to bias the first core to a closed position.

9. A post-mix beverage dispenser comprising:
   a concentrate tube connected to a liquid concentrate source;
   a diluent tube connected to a liquid diluent source;
   a dispensing valve including:
      a first flow regulator connected to the concentrate tube and a concentrate outlet tube;
      a second flow regulator connected to the diluent tube and a diluent outlet tube; and
      a moveable valve activation device including:
         a motor positioned along a central axis of the post-mix beverage dispenser, the motor comprising an upwardly-extending motor shaft;
         a rotary arm having a fixed end attached to the motor shaft and a free end extending radially outward from the fixed end; and
         an electromagnet fixed to the free end of the rotary arm,
      wherein the moveable vale activation device can be positioned adjacent the first flow regulator to open the first flow regulator to permit liquid concentrate flow from the concentrate tube to the concentrate outlet tube or adjacent the second flow regulator to open the second fluid flow regulator to permit liquid diluent flow from the diluent tube to the diluent outlet tube.

10. The post-mix beverage dispenser of claim 9, further comprising:
    a nozzle connected to the concentrate outlet tube and the diluent outlet tube, such that the liquid concentrate and the liquid diluent mix at the nozzle to dispense a beverage.

11. The post-mix beverage dispenser of claim 9, wherein the motor moves the movable valve activation device to the first position or the second position in response to a first electronic input signal.

12. The post-mix beverage dispenser of claim 9, wherein the shaft of the motor rotates to move the movable valve activation device to the first position or the second position, and
    wherein the shaft defines a rotation axis.

13. The post-mix beverage dispenser of claim 9,
    wherein the motor rotates the movable valve activation device via the rotary arm.

14. The post-mix beverage dispenser of claim 9, wherein the first flow regulator and the second flow regulator are arranged along a curve.

15. The beverage dispensing valve system of claim 14, wherein an angular displacement between the first position and the second position is at least approximately 20 degrees about a center of the curve.

16. The beverage dispensing valve system of claim 14, wherein an angular displacement between the first position and the second position is from approximately 18 degrees to approximately 90 degrees about a center of the curve.

* * * * *